(12) United States Patent
Ryerson et al.

(10) Patent No.: US 6,386,133 B1
(45) Date of Patent: May 14, 2002

(54) TORPEDO TUBE SHUTTER-PRESSURE RELEASE

(75) Inventors: Michael R. Ryerson, Fall River, MA (US); Paul E. Moody, Barrington, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 38 days.

(21) Appl. No.: 09/656,193

(22) Filed: Sep. 6, 2000

(51) Int. Cl.$^7$ ................................................ B63B 5/00
(52) U.S. Cl. ........................ 114/238; 114/317; 114/333; 114/320
(58) Field of Search .................... 114/238, 316–319, 114/342, 341, 279, 288, 289, 290, 320, 333, 335, 317

(56) References Cited

U.S. PATENT DOCUMENTS

| | | | | |
|---|---|---|---|---|
| 1,864,471 A | * | 6/1932 | Rademacher | 114/335 |
| 3,664,366 A | * | 5/1972 | Munguet | 114/333 |
| 3,732,838 A | * | 5/1973 | Kriedt et al. | 114/333 |
| 3,860,983 A | * | 1/1975 | Furth et al. | 114/333 |
| 4,004,533 A | * | 1/1977 | Woolston | 114/333 |
| 4,069,923 A | * | 1/1978 | Blumenau et al. | 114/333 |
| 5,165,360 A | * | 11/1992 | Moody | 114/316 |
| 5,208,422 A | * | 5/1993 | Moody | 114/238 |
| 5,450,807 A | * | 9/1995 | Moody | 114/202 |
| 5,666,897 A | * | 9/1997 | Armstrong | 114/20.1 |

* cited by examiner

Primary Examiner—Michael J. Carone
Assistant Examiner—Denise J. Buckley
(74) Attorney, Agent, or Firm—Michael J. McGowan; James M. Kasischke; Prithvi C. Lall

(57) ABSTRACT

Two-way pressure release valves in a shutter reduce the force needed to rotate it from a torpedo tube while the submarine is underway at high speeds. The valves are each mounted in a separate aperture in the shutter and have a pair of biasing springs that hold opposite end surfaces coplanar with outer and inner surfaces of the shutter to prevent generation of objectionable flow-noise while underway. When the shutter is rotated to expose a muzzle door of a torpedo tube, the valves are automatically displaced by pressure differentials created to free pathways for pressure equalization. The water flowing through the valves eliminates the pressure differentials, and consequently, reduces the total amount of force that would otherwise be needed to rotate the shutter.

10 Claims, 2 Drawing Sheets

TORPEDO TUBE SHUTTER-PRESSURE RELEASE

DESCRIPTION OF THE PRIOR ART

Modern submarines need the capability to launch torpedoes while underway. These undersea craft usually have fairing-like structures that cover the torpedo tubes to reduce turbulence and associated hull generated noise. The structures are removed before torpedoes can be launched. The mechanisms required to move the structures may be too heavy and bulky if they must not only move the weight of the structure but also overcome the pressure created across the sides of the structures due to hydrodynamic flow over the structure's surfaces.

Thus, in accordance with this inventive concept, a need has been recognized in the state of the art for an apparatus for reducing the total force needed to open shutters covering torpedo tubes so that torpedoes may be launched while underway at high speeds.

SUMMARY OF THE INVENTION

An object of the invention is to provide an apparatus for reducing the force necessary to displace a shutter from its open to closed position and back.

Another object of the invention is to provide an apparatus for eliminating pressure imbalance across a shutter to reduce the force necessary to displace it.

Another object of the invention is to provide an apparatus for reducing force to displace a shutter from the muzzle of a torpedo tube that virtually eliminates influences of speed of the submarine.

Another object of the invention is to provide an apparatus for reducing force to displace a shutter from the muzzle of a torpedo tube that is automatic and, therefore, free from potential operator error.

Another object of the invention is to provide an apparatus for reducing force to displace a shutter from the muzzle of a torpedo tube which simplifies connecting linkages and decreases manufacturing cost.

Another object of the invention is to provide cost-effective two-way valves in a shutter that eliminate pressure differentials from being developed across the shutter.

Another object of the invention is to provide pressure relief valves in a shutter that eliminate pressure differentials attributed to water flow on the side of the shutter adjacent the ambient ocean.

These and other objects of the invention will become more readily apparent from the ensuing specification when taken in conjunction with the appended claims.

The present invention provides an apparatus for reducing force needed to displace a shutter covering a torpedo tube while the vessel is underway at high speeds. A plurality of pressure relief valves are mounted in the shutter and each has a retaining ring secured in a lateral aperture in the shutter. A central portion of the relief valve has an annular rim portion positioned in the shutter lateral aperture. A first end portion at one end of the central portion is provided with a first end surface extending in a first aperture in the shutter. The first aperture is coaxial with and in communication with the lateral aperture. A second end portion at the opposite end of said central portion is provided with a second end surface extending in the retaining ring aperture. A first biasing spring is positioned in the lateral aperture between the shutter and a first side of the annular rim portion, and a second biasing spring is positioned in the lateral aperture between a second side of the annular rim portion and the retaining ring. These springs hold the first end surface coplanar with a top surface of the shutter and the second end surface coplanar with a bottom surface of the shutter thereby preventing generation of objectionable levels of flow noise.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein.

DESCRIPTION OF THE PREFERRED EMBODIMENTS

Figure 1:
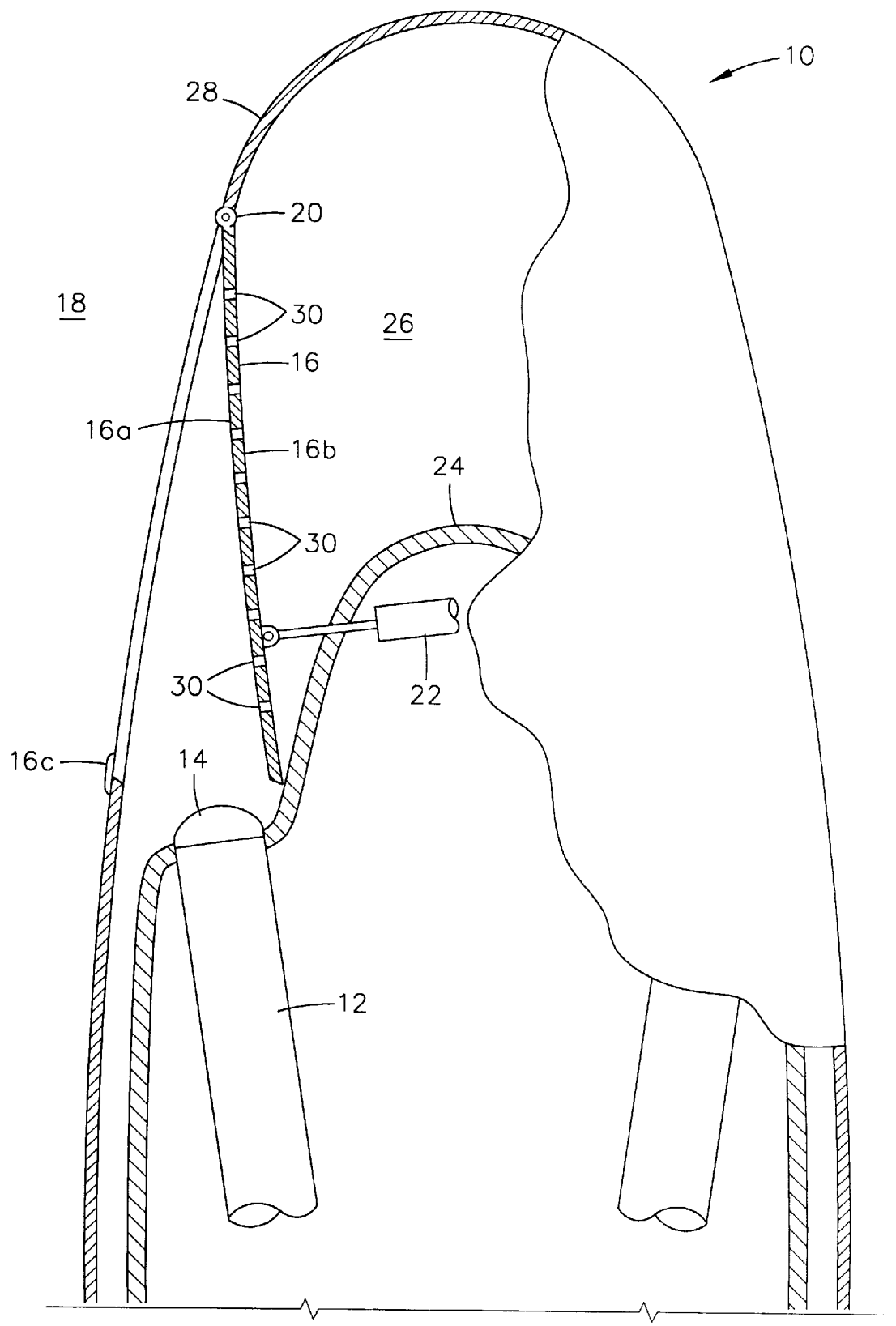
FIG. 1 schematically shows a top view of a portion of a submarine having a displaceable shutter selectively covering the muzzle door of a torpedo tube and pressure release valves in the shutter.

Referring to FIG. 1, modern submarine 10 is capable of launching torpedoes while underway. Each torpedo tube 12, (only one of which is fully shown) has a muzzle door 14. Shutter 16 selectively covers muzzle door 14 to function as a displaceable fairing that deflects flowing water 18 of the surrounding ocean to avoid creating excessive flow noise as submarine 10 proceeds at high speed. Shutter 16 may be mounted on hinge 20 and is selectively, rotatably displaced by hydraulic power cylinder mechanism 22 that may be located within pressure hull 24. Each shutter 16 has one side 16b adjacent freely-flooded region 26 of submarine 10 and creates a streamlined, faired surface on an other side 16a with outer (non pressure containing) hull 28 when it is rotated to the closed position, and muzzle door 14 of each torpedo tube 12 is closed. When muzzle door 14 is opened and shutter 16 is rotated to the open position, a clear path is created for ordnance (not shown) to be fired from submarine 10.

Shutter 16 can either be operated independently or may be mechanically connected to the operation of muzzle door 14. In either case, the size of hydraulic power cylinder mechanism 22 to provide normal operating forces is determined by calculating the frictional drag of the mechanism of operating cylinder 22 and hinge 20, the weight of all the components involved (including shutter 16, hinge 20, and hydraulic power cylinder mechanism 22), and a safety factor incorporated to account for variations between calculated loads and actual shipboard installations. Such factors as component misalignment, wear of parts, deflections under pressure and hydrodynamic loads are accounted for by the safety factor.

In accordance with this invention it has been discovered that during transit of submarine 10, the velocity of the flow of ambient water 18 over outer hull 28 (and sea side surface 16a of shutter 16) intensifies as submarine 10 increases speed. This condition results in a pressure drop on sea-side surface 16a of shutter 16 as compared to the relatively stagnant water pressure in freely-flooded region 26 between outer hull 28 and pressure hull 24 that is also adjacent surface 16b of shutter 16. This pressure drop, or pressure differential creates an outward force on surface 16b which pushes shutter 16 snugly against shutter stop 16c while submarine 10 is underway at high speeds. While this pressure differential is small, the area of shutter 16 is large; therefore, a significant force is developed on shutter surface 16b in a direction that tends to keep shutter 16 more tightly closed.

Therefore, if shutter 16 is to be opened during these high speeds, a total force must be overcome that includes these significant and normal operating forces. A more substantial power cylinder mechanism 22 and all the associated linkage and components operated by power cylinder mechanism 22 would have to be robust enough to withstand the total force, or loads imposed on all the parts of individual pieces. During high-speed operations, the total force that must be exerted might be so substantial that it may be impossible to open shutter 16. Under such conditions, the speed of submarine 10 is slowed; shutter 16 is opened; ordnance is deployed; and submarine 10 then resumes high-speed transit. This slow down and delay procedure could create a critical tactical disadvantage.

In accordance with this invention a plurality of two-way, pressure release valves 30 are included in shutter 16 to eliminate, or alleviate, the pressure differential across shutter 16 that is caused by water 18 flowing over it during high-speed travel of submarine 10. Pressure release valves 30 provide a flow path between both sides, or surfaces 16a and 16b of shutter 16 that will eliminate the pressure imbalance caused by high-speed transit. When this pressure imbalance is eliminated, the force to displace shutter 16 is lessened. In addition, pressure release valves 30 of this invention do not create unacceptable noise sources as compared to the objectionable levels of flow noise generated by numbers of simple holes drilled through shutter 16. Making pressure release valves 30 from strong and non-corrosive or corrosion resistant materials assures long-term, automatic trouble-free operation.

Figure 2:
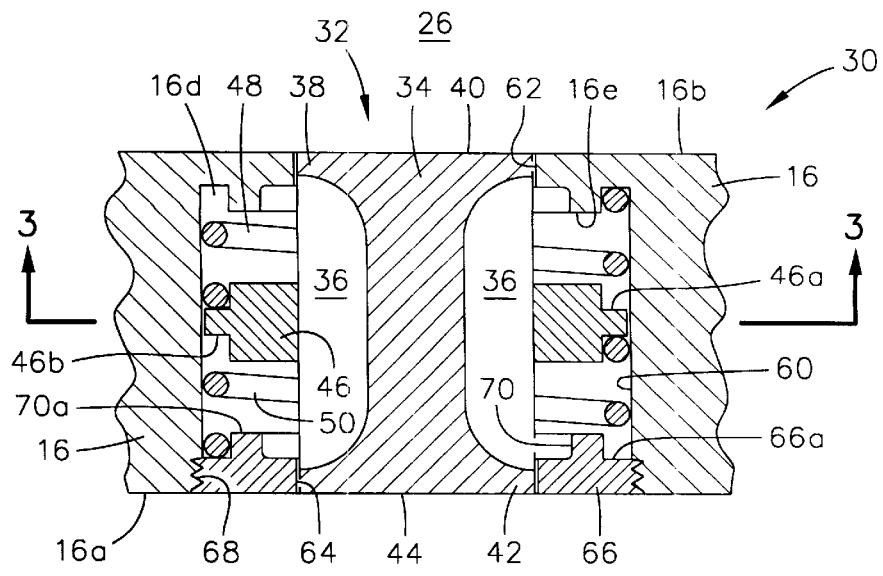
FIG. 2 is a cross-sectional side view of a pressure release valve in a shutter during a condition of balanced pressure on both sides of the shutter.
Figure 3:
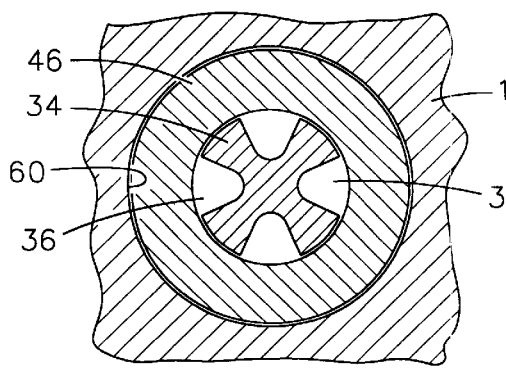
FIG. 3 is a cross-sectional view of the pressure release valve taken along line 3—3 in FIG. 2.

Referring also to FIGS. 2 and 3, each pressure release valve 30 has piston assembly 32 disposed in lateral bore 60 in shutter 16. Piston assembly 32 is a displaceable, essentially elongate, cylindrically shaped component that has central shaft portion 34 provided with four elongate flutes 36 machined in an equal-distantly, circumferentially spaced relationship to extend parallel with the axis of central portion 34. First end portion 38 of central shaft portion 34 extends through first bore 62 in shutter 16 to locate end surface 40 coplanar with surface 16b of shutter 16 that is in contact with freely flooded region 26. First end portion 38 is sized to slidably fit within first bore 62 to permit its axial reciprocal displacement in first bore 62. Second end portion 42 of central portion 34 extends through second bore 64 in annular retaining piece 66 to locate end surface 44 coplanar with surface 16a of shutter 16. Second end portion 42 is sized to slidably fit within second bore 64 to permit its axial reciprocal displacement in second bore 64.

Lateral bore 60, first bore 62, and second bore 64 are coaxially aligned. As shown, first bore 62 has a diameter smaller than that of lateral bore 60. Second bore 64 also has a smaller diameter which can be equal to that of first bore 62. While they are identified as "bores", lateral bore 60, first bore 62, and second bore 64 are apertures formed in the associated part by any means known in the art.

Piston assembly 32 is retained in lateral bore 60 by annular retaining piece 66 which is screwed (or bolted) into threaded recess 68 that is adjacent lateral bore 60 in shutter 16. Retaining piece 66 may be secured in threaded recess 68 by interposing a strong adhesive before tightening retaining piece 66. Spacer ring 70 of selectively different thickness may be provided when needed under retaining piece 66 so that an adjustment is available to position end surface 44 of second end portion 42 coplanar with surface 16a. Piston assembly 32 is provided with annular rim portion 46 that extends radially outwardly from central shaft portion 34 and is sized to slidably fit within lateral bore 60 to permit its axial reciprocal displacement in lateral bore 60. Annular rim portion 46 has a greater diameter than first bore 62 and second bore 64, so that piston 32 is retained within lateral bore 60. First coiled spring 48 helically extends around central shaft portion 34 and is held compressed between annular recess 16d in shutter 16 and annular shoulder 46a in annular rim portion 46. Second coiled spring 50 helically extends around central shaft portion 34 and is held compressed between annular shoulder 46b in annular rim portion 46 and annular recess 66a in annular retaining piece 66.

Under normal operating conditions as shown in FIG. 2, springs 48 and 50 are coiled about central portion 34 respectively to exert outward biasing forces between annular recess 16d and annular shoulder 46a, and between annular shoulder 66a and annular shoulder 46b. These biasing forces hold outer end surface 40 in the same plane as surface 16b and outer end surface 44 in the same plane as surface 16a.

Figure 4:
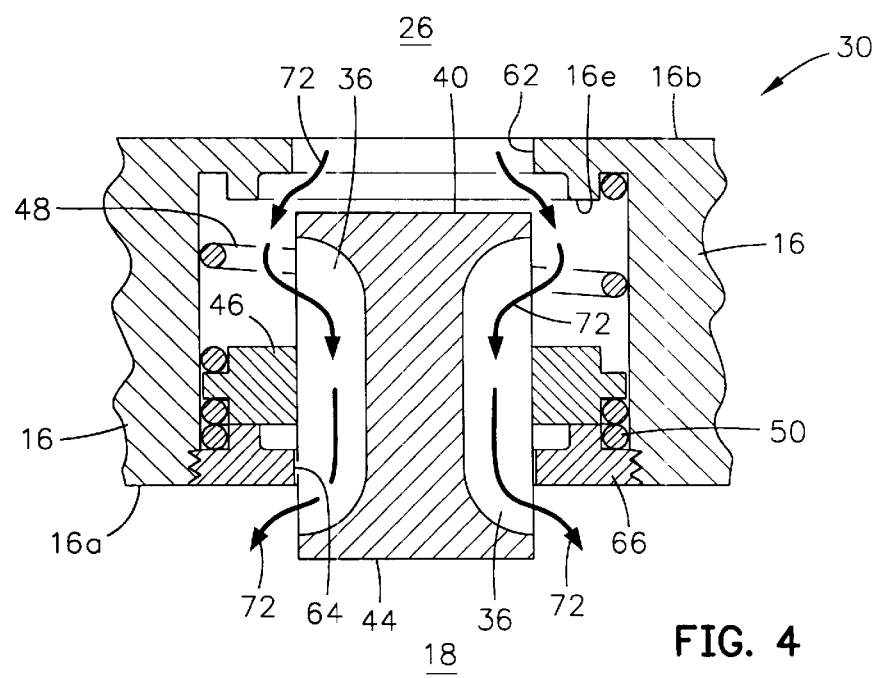
FIG. 4 is a cross-sectional side view of a pressure release valve in a shutter during a condition of unbalanced pressure, or pressure differential across the shutter showing flow of water from the higher-pressure side of the shutter to a lower pressure side of the shutter.

Referring to FIG. 4 in combination with FIG. 1, when hydraulic power cylinder mechanism 22 is activated to rotate shutter 16 inward (open it) and expose muzzle door 14, or flow in area 18 creates a differential pressure between end surfaces 40 and 44 of central shaft portion 34 of piston assembly 32, the differential pressure axially displaces central shaft portion 34 downward. As this axial displacement occurs, spring 48 is flexed to be extended; spring 50 is flexed to be compressed; opposite ends of flutes 36 in central shaft portion 34 are exposed to ambient water 18 and water in freely-flooded region 26; and one side of annular rim portion 46 comes to abut an upper surface 70a of spacer ring 70 (or retaining piece 66). Water flows (see flow arrows 72) from higher pressure side in freely-flood region 26 that is adjacent surface 16b of shutter 16 through flutes 36. This water flow 72 passes through flutes 36 and to lower pressure water 18 that is adjacent surface 16a of shutter 16 and outside of outer hull 28. This water flow 72 from, perhaps a number of pressure release valves 30 disposed in a spaced-apart relationship in shutter 16, relieves the pressure differential between the regions adjacent surfaces 16a and 16b of shutter 16. Consequently, less force needs to be exerted by mechanism 22 to further open shutter 16. If changing water-flow conditions or some other phenomena causes the pressure differential to recur before shutter 16 is fully opened, central portion 34 of piston assembly 32 will again be displaced and flutes 36 be opened to permit water flow 72 through flutes 36 and balance the forces caused by the hydrodynamic loads.

Other water-flow conditions, or some other reason such as rotating shutter 16 in the opposite direction to close shutter 16 may cause an inverse pressure differential to be created. In this case, the inverse pressure differential will flex biasing springs oppositely to the flexure described above so that spring 48 will compress and spring 50 will extend as central portion 34 of piston assembly 32 is axially displaced in the opposite, or reciprocal direction to open the flow of water in the opposite direction as indicated for water flow 72. In other words, as this axial opposite displacement occurs, spring 48 is flexed to be compressed; spring 50 is flexed to be extended; opposite ends of flutes 36 in central shaft portion 34 are exposed to ambient water 18 and water in freely-flooded region 26; and the other side of annular rim portion 46 comes to abut an internal surface 16e of shutter 16. The opposite directional flow of water is through flutes 36 in the opposite direction as water flow 72 to balance the forces caused by the other hydrodynamic loads. Thus, piston assembly 32 of two-way pressure release valve 30 of this invention is capable of bi-directional, or reciprocal excursions and flow to permit compensation of bi-directional pressure differentials. In addition, this bi-directional capability of pressure release valve 30 also will account for possible development of unanticipated flow vortices that could change the net hydrodynamic load on shutter 16 prior to being fully opened or closed.

Since pressure release valves 30 of this invention in shutter 16 eliminate additional forces from being created by pressure imbalances across shutter 16, the total force requirements of hydraulic power cylinder mechanism 22 are reduced. This means a reduction of size, weight, associated linkages, and supportive structure at lower cost.

Two-way valve 30 is unattended and automatically reduces the total force necessary to operate shutter 16, and potential operator error is eliminated. This automatic feature frees members of the crew from one additional consideration during intensive tactical scenarios.

Having the teachings of this invention in mind, modifications and alternate embodiments of this invention may be fabricated to have a wide variety of applications in other systems. For example, in accordance with this invention, the size, quantity, and locations of two-way valves 30 in shutter 16 can be tailored to accommodate different designs of shutter 16, locations of shutters 16 on the hull of a craft, different hull designs and operational depths, and other sound marine design criteria concerning other flow paths between outer and inner hulls. Many different materials for fabrication of the constituent components could be incorporated to accommodate diverse load requirements without departing from the scope of this invention.

The disclosed components and their arrangements as disclosed herein all contribute to the novel features of this invention. This invention provides a reliable and cost-effective way to reduce the total force required to open and close shutter 16 on muzzle door 14 of torpedo tube 12. Therefore, pressure release valve 30, as disclosed herein is not to be construed as limiting, but rather, is intended to be demonstrative of this inventive concept.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for selectively covering an undersea door of a vessel comprising:
   a shutter pivotally mounted at one end of the vessel structure for selectively covering the undersea door, said shutter having at least one lateral aperture with an associated first aperture in communication with said lateral aperture, each said lateral aperture and first aperture combination extending through said shutter; and
   a two-way valve disposed in each said lateral aperture, said two-way valve comprising:
   a retaining ring secured in said lateral aperture in said shutter and having a second aperture extending therethrough;
   a central portion having an annular rim portion disposed in said lateral aperture of said shutter, a first end portion at one end of said central portion provided with a first end surface extending in said first aperture in said shutter, and second end portion at the opposite end of said central portion provided with a second end surface extending in said second aperture;
   a first biasing spring in said lateral aperture between said shutter and a first side of said annular rim portion; and
   a second biasing spring in said lateral aperture between a second side of said annular rim portion and said retaining ring, said first and second biasing springs holding said first end surface coplanar with a top surface of said shutter and said second end surface coplanar with a bottom surface of said shutter to prevent generation of objectionable levels of flow noise.

2. An apparatus according to claim 1 wherein said central portion has a plurality of elongate flutes machined therein extending parallel with the axis of said central portion.

3. An apparatus according to claim 2 wherein:
   said annular rim portion of each two-way valve is sized to slidably fit within said lateral aperture of said shutter to permit axial reciprocal displacement of said annular rim portion in said lateral aperture;
   said first end portion is sized to slidably fit within said first aperture in said shutter to permit axial reciprocal displacement of said first end portion in said first aperture;
   said second end portion is sized to slidably fit within second aperture to permit axial reciprocal displacement of said second end portion in said second aperture; and
   said lateral, said first and said second apertures are coaxially aligned.

4. An apparatus according to claim 3 wherein a first pressure differential from said top surface of said shutter to said bottom surface of said shutter causes axial displacement of said central portion of each two-way valve in one direction and flexure of said first and second biasing springs of each two-way valve to expose opposite ends of said flutes to ambient water and to permit flow of water therethrough for pressure equalization across said shutter.

5. An apparatus according to claim 4 wherein a second pressure differential inverse to said first pressure differential causes axial displacement of said central portion of each two-way valve in the opposite direction from said one direction and opposite flexure of said first and second biasing springs of each two-way valve to expose opposite ends of said flutes to ambient water and to permit an opposite flow of water therethrough for pressure equalization across said shutter.

6. An apparatus according to claim 5 wherein:
   one side of said annular rim portion of each two-way valve abuts an upper surface of said retaining piece of each two-way valve during said pressure differential; and
   another side of said annular rim portion abuts an exposed surface of said shutter during said inverse pressure differential.

7. An apparatus for selectively covering an undersea door of a vessel comprising:
   a shutter pivotally mounted at one end to said vessel for selectively covering the undersea door, said shutter having at least one aperture therein which extends through said shutter;

a two-way valve disposed in each said aperture flush against said shutter, said two-way valve allowing communication of fluid from a first side of said shutter to a second side on existence of a pressure differential between said first side and said second side; and an actuator joined to said shutter and said vessel for pivoting said shutter.

8. The apparatus of claim 7 wherein said two-way valve comprises:

a housing having a lateral aperture formed therein in communication with said second side and a first aperture formed therein in communication between said first side and said lateral aperture, said first aperture having diameter smaller than that of said lateral aperture;

a piston assembly having a first face positioned at a first end, a second face positioned at a second end, a body portion having at least one flute formed therein, and an annular rim portion about said body portion and slidably positioned in said lateral aperture, said annular rim portion having a diameter larger than said first aperture diameter;

an annular retaining piece having a second aperture therein joined within said housing lateral aperture between the interior of said housing and said second side, said second aperture having a diameter smaller than said lateral aperture diameter and said annular rim portion diameter;

a first biasing means positioned within said housing lateral aperture between said piston assembly annular rim and a shoulder defined by said housing first aperture and said housing lateral aperture, said first biasing means biasing said piston assembly away from said first side; and a second biasing means positioned within said housing lateral aperture between said piston assembly annular rim and said annular retaining piece, said second biasing means biasing said piston assembly away from said second side;

said piston assembly having a rest position wherein said piston assembly first face interferes with communication between said first side and said lateral aperture through said first aperture and said second face interferes with communication between said second side and said lateral aperture through said second aperture, said piston assembly sliding within said housing lateral aperture in response to a pressure differential between said first side and said second side to an open position wherein said at least one flute allows communication between said lateral aperture and one of said first and second sides through a corresponding one of said first and second apertures.

9. The assembly of claim 8 wherein:

said first biasing means comprises a first helical spring; and said second biasing means comprises a second helical spring.

10. The assembly of claim 9 wherein said annular retaining piece is removable from said housing for allowing disassembly of said assembly.

\* \* \* \* \*